US 6,745,164 B2

United States Patent
Akita (10) Patent No.: US 6,745,164 B2
(45) Date of Patent: Jun. 1, 2004

(54) DVD-AUDIO PLAYBACK METHOD AND PLAYBACK DEVICE

(75) Inventor: Koji Akita, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 561 days.

(21) Appl. No.: 09/758,107

(22) Filed: Jan. 10, 2001

(65) Prior Publication Data

US 2002/0052732 A1 May 2, 2002

(30) Foreign Application Priority Data

Oct. 27, 2000 (JP) ........................................ 2000-327881

(51) Int. Cl.[7] .............................................. G10L 19/00
(52) U.S. Cl. ........................................ 704/272; 386/124
(58) Field of Search .............................. 704/200, 272, 704/125; 386/46, 66, 120, 124

(56) References Cited

U.S. PATENT DOCUMENTS

| | | | | |
|---|---|---|---|---|
| 4,872,068 A | * | 10/1989 | Ishii et al. .................. | 386/105 |
| 5,956,093 A | * | 9/1999 | Yang .......................... | 348/554 |
| 5,987,417 A | | 11/1999 | Heo et al. | |
| 6,151,067 A | * | 11/2000 | Suemoto et al. ....... | 348/207.99 |
| 6,473,135 B1 | * | 10/2002 | Iwamura .................... | 348/706 |
| 6,529,506 B1 | * | 3/2003 | Yamamoto et al. ......... | 370/389 |
| 6,567,608 B2 | * | 5/2003 | Mori et al. .................. | 386/96 |

* cited by examiner

*Primary Examiner*—Daniel Abebe
(74) *Attorney, Agent, or Firm*—Brinks Hofer Gilson & Lione (57) ABSTRACT

A DVD-Audio player includes an automatic data selection setting unit. The automatic data selection setting unit specifies the type of data to be output by an output data selection unit. The specified type of data is fed to a signal separation unit to be separated into audio data and video data. The separated audio data is output via an audio output unit to a speaker, and the separated video data is output via a video output unit to a monitor. Independent audio data is selected for output when the monitor is not connected, when the monitor is powered off, and when the monitor is being used for navigation or for receiving TV broadcasts. Otherwise, audio data with video data is selected for output. The DVD-Audio player also includes a manual data selection setting unit that allows the user to alter the setting as desired.

18 Claims, 6 Drawing Sheets

DVD-AUDIO PLAYBACK METHOD AND PLAYBACK DEVICE

BACKGROUND OF THE INVENTION

1. Field of the Invention

The present invention relates to a DVD-Audio playback method and playback device, and more particularly to a DVD-Audio playback method and playback device which allows flexible selection as to whether both image and sound are output, or only the sound is output, via a monitor and a speaker connected to the device.

2. Description of the Related Art

With the recent development of audio devices, conventional analog audio media such as records and cassette tapes have rapidly been replaced by digital audio media with higher recording density and larger recording capacity, such as compact disks (CD) and mini disks (MD). More recently, use of the DVD (Digital Versatile Disk) as a digital audio recording medium has been considered in order to provide an even higher density and an even larger capacity, and the technology will be available on the market in the near future as DVD-Audio. With such a large storage capacity, DVD was originally developed as a medium for recording images, and is in practical use as DVD-Video disks which store image data compressed in accordance with the MPEG2 standard. Meanwhile, it is widely accepted that DVD-Audio will employ formats different from DVD-Video in order to store audio data.

In DVD-audio, which has a large storage capacity, it is expected that a great deal of recording space will remain after the desired audio data has been recorded. Thus, it is envisaged that video data, as well as data for displaying the performer, title, and other information related to each piece of music, etc., will be recorded in the remaining portion. Regarding the recording of video data in particular, in one feasible method, video data is separately stored and is played back in accordance with the DVD-video standards. However, when the video images are intended to be only supplementary to the audio data, it is rather extravagant and expensive to incorporate the type of playback control unit designed for DVD-Video devices.

Accordingly, it has been proposed that video data control information as well as video data be recorded in association with the audio data, so that, in accordance with the video control information, a DVD-Audio player with video output capability will output the video data to a monitor in synchronization with the audio data. The monitor may display still pictures as well as moving pictures as desired.

Figure 4A:
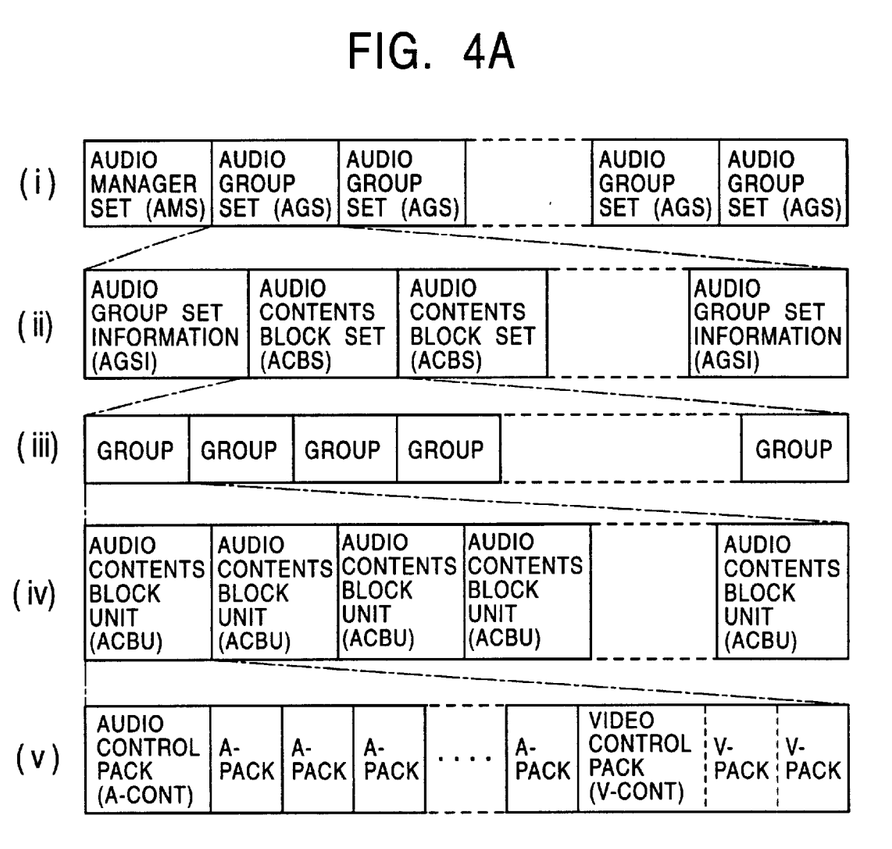
FIG. 4A is a schematic diagram showing the configuration of DVD-Audio data stored in accordance with an audio-video combined recording method.

FIG. 4A shows an example of the data arrangement. The entire DVD data is constituted of an Audio Manager Set (AMS) at the beginning thereof, and a plurality of Audio Group Sets (AGS) following the Audio Manager Set, as shown in (i). Each of the Audio Group Sets includes two regions of Audio Group Set Information (AGSI), one each at the beginning and at the end thereof, and a plurality of Audio Contents Block Sets (ACBS) in between, as shown in (ii). Each of the Audio Contents Block Sets is divided into a plurality of groups as shown in (iii), and each of the groups is further divided into a plurality of Audio Contents Block Units (ACBU) having a variety of hierarchical properties, as shown in (iv).

An example of the Audio Contents Block Units is shown in (v). The Audio Contents Block Unit includes a plurality of A-Packs, of about 2,048 bytes each, storing audio data as well as system clock data, and in front of the A-Packs, an Audio-Control Pack (A-CONT) storing data for controlling the playback of the A-Packs. The video data to be displayed in synchronization with the audio data is also included in the same Audio Contents Block Unit. More particularly, similar to the audio data, there are included a plurality of V-Packs storing video data as well as system clock data, and, in front of the V-Packs, a Video Control Pack (V-CONT) for controlling the playback of the V-Packs. When any video data is included as above, control data is provided in the Audio Control Pack in order to synchronize the outputs of the audio data and the video data.

DVD-Audio players distinguish the data types, i.e., whether only the audio data is stored or the video data is stored as well, according to whether any V-Pack is included in the Audio Contents Block Unit.

With no single standard established yet, a variety of DVD-Audio recording methods in addition to the above have been proposed. For example, one proposed method dictates that, instead of using the Video Control Pack as described above, a Control Pack responsible for controlling the entire unit be provided at the beginning of the Audio Contents Block Unit, so that the V-Packs as well as the data in the Audio Control Pack are controlled in accordance with the control data provided in the Control Pack.

Figure 4B:
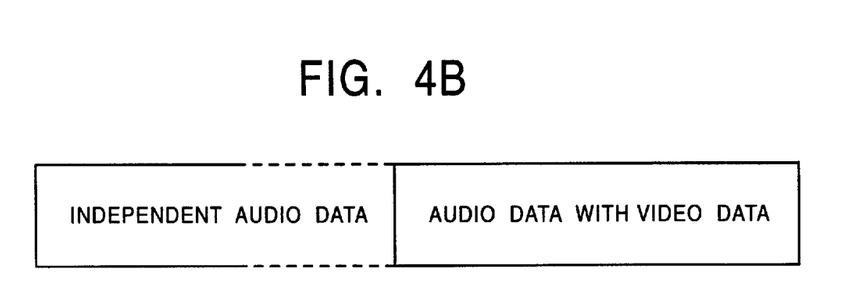
FIG. 4B is a schematic diagram showing the configuration of DVD-Audio data stored in accordance with an audio-video separate recording method.

Furthermore, it has also been proposed that the storage area of a DVD disk include separate storage areas respectively for independent audio data and for combined audio-video data, so that either type of data is played back in accordance with playback instructions, as shown in FIG. 4B. That is, in response to a playback instruction for audio data only, the independent audio data is read for playback, while in response to a playback instruction for both audio data and video data, the combined audio-video data is read for playback. The combined audio-video data may be recorded in accordance with DVD-Video standards as well as DVD-Audio standards.

Figure 5:
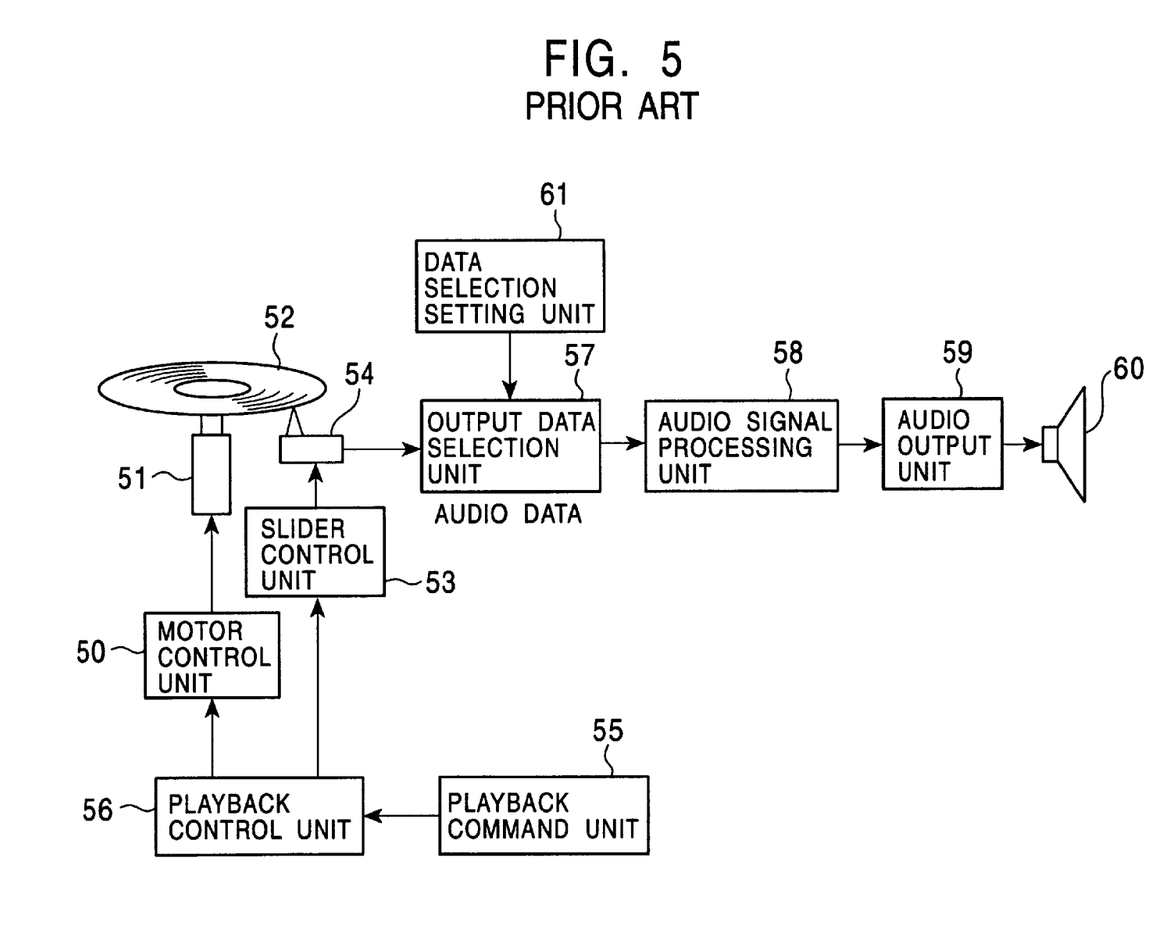
FIG. 5 is a functional block diagram of a conventional DVD-Audio player dedicated for audio.

The DVD-Audio disk as described above may be played back, for example, by a DVD-Audio player provided with a speaker but not with any display device, as shown in the functional block diagram of FIG. 5. Referring to FIG. 5, a motor control unit 50 controls a motor 51, and the motor 51 in turn spins a DVD-Audio disk 52. A slider control unit 53 controls the position of an optical pickup 54 in the radial direction of the disk 52, so that the data is read accordingly. In accordance with the output of a playback command unit 55 for select, playback, stop, fast-forward, and other user commands, a playback control unit 56 controls the motor control unit 50 and the slider control unit 53, so that the player operates in accordance with the instructions.

Of the data read by the pickup 54, the type of data as selected in an output data selection unit 57 is fed to an audio signal processing unit 58. The setting as to which type of data should be output by the output data selection unit 57 is made in a data selection setting unit 61. Because the DVD-Audio player shown in FIG. 5 is intended to serve as a DVD-Audio player for dedicated playback of audio data, being connected to a speaker 60 but not to any display device, the setting in the data selection setting unit 61 is made so that only audio data is output; accordingly, the independent audio data is selected in the output data selection unit 57.

When the independent audio data is fed from the output data selection unit 57, the audio signal processing unit 58 processes the audio data, so that the audio data is output via an audio output unit 59 to a speaker 60. Thus, the DVD- Audio player, which is dedicated to audio, plays back the independent audio data while not outputting the audio data with the video data.

Figure 6:
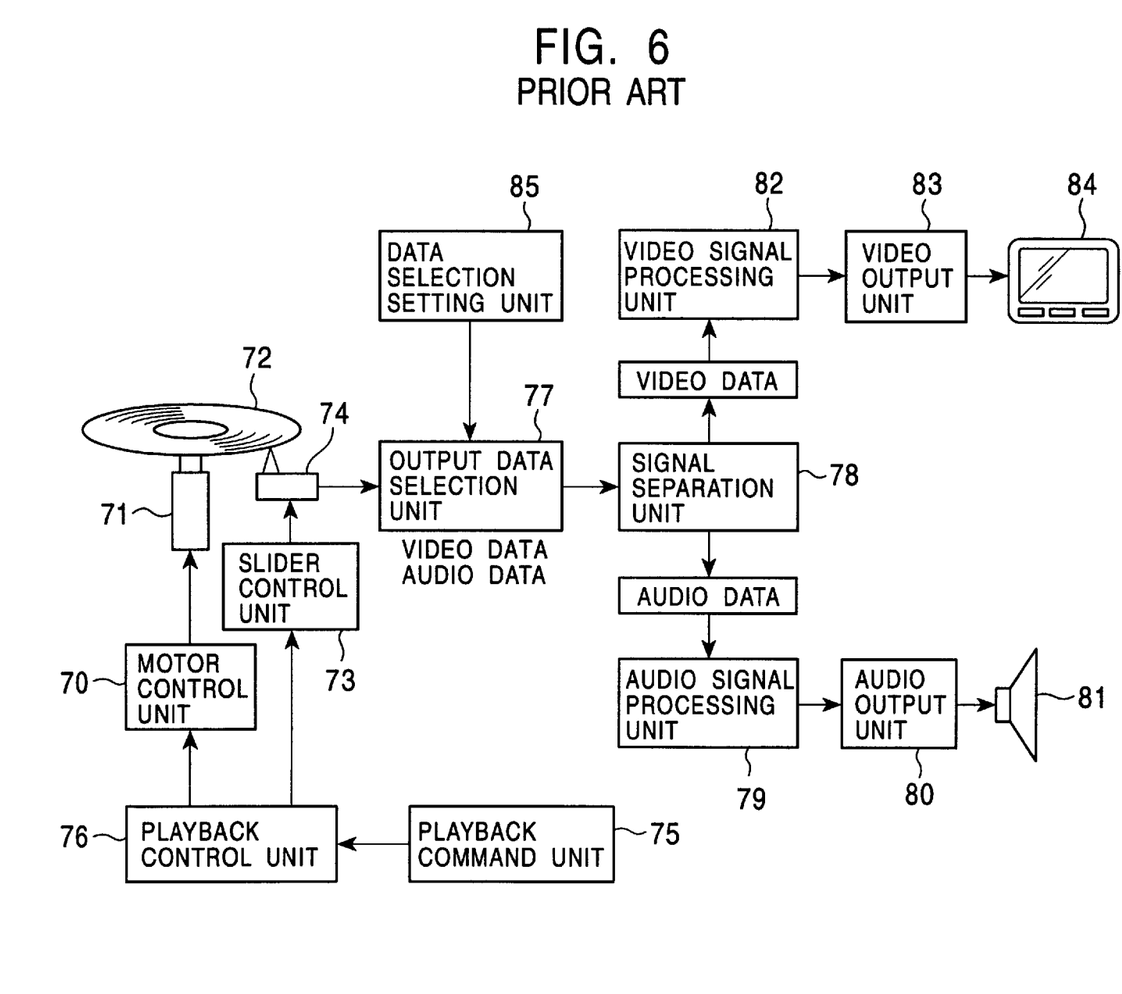
FIG. 6 is a functional block diagram of a conventional DVD-Audio player with video output capability.

The DVD-Audio disk may also be played back by a DVD-Audio player provided with both a speaker and a display device, as shown in the functional block diagram of FIG. 6. Referring to FIG. 6, like in FIG. 5, a motor control unit 70 controls a motor 71, and the motor 71 in turn spins a DVD-Audio disk 72. A slider control unit 73 controls the position of an optical pickup 74 in the radial direction of the disk 72, so that the data is read accordingly. In accordance with the output of a playback command unit 75 for select, playback, stop, fast-forward, and other user commands, a playback control unit 76 controls the motor control unit 70 and the slider control unit 73, so that the player operates in accordance with the instructions.

Of the data read by the pickup 74, the audio data with video data is selected in an output data selection unit 77 to be fed to a signal separation unit 78. Because the DVD-Audio player shown in FIG. 6 is intended to serve as a DVD-Audio player with video output capability, being connected to a monitor 84 as well as a speaker 60, the setting is made in a data selection setting unit 85 so that both audio data and video data are selected in the output data selection unit 77. Accordingly, the output data selection unit 77 outputs the video data as well as the audio data read by the pickup 74 to the signal separation unit 78.

The signal separation unit 78 separates the audio data and the video data. The audio data separated in the signal separation unit 78 is fed to an audio signal processing unit 79 for audio signal processing, and is then output via an audio output unit 80 to a speaker 81. The video data separated in the signal separation unit 78 is fed to a video signal processing unit 82 for video signal processing, and then is output via a video output unit 83 to a monitor 84.

When the user purchases a DVD-Audio player, the user needs to make a choice between a DVD-Audio player dedicated for audio and a DVD-Audio player with video output capability.

Although the DVD-Audio player dedicated for audio is relatively cheap, if the user later comes to desire playback of video data as well as audio data, the user needs to buy a new DVD-Audio player with video output capability, rendering useless the previously purchased DVD-Audio player for audio only.

On the other hand, the DVD-Audio with video output capability is expensive in itself, and is even more costly if a liquid crystal display is purchased at the same time. Thus, the user may consider purchasing a DVD-Audio player with video output capability, but not a monitor, and use the player for audio output only. The user may buy a monitor in addition anytime later when the user comes to desire playback of video data as well as audio data.

This is feasible as long as the audio data to be played back is independent audio data, or audio data associated with video data but which can be played back without outputting the video data. However, some DVD-Audio disks include in the video data a menu for playback of audio data so that the user can play back the audio data by operating the menu displayed on a monitor. In this case, output of video data is required for the playback of audio data. Thus, if the user desires to play back DVD-Audio disks of this type, the user needs to purchase a monitor together with the DVD-Audio player.

Furthermore, when the monitor is being used for other purposes such as navigation and reception of TV broadcasts, the monitor must be interrupted for the DVD-Audio video output in order to play back the audio data.

SUMMARY OF THE INVENTION

Accordingly, it is an object of the present invention to provide a DVD-Audio playback method and DVD-Audio playback device for outputting either audio data only or both audio data and video data as desired by the user.

To this end, according to one aspect of the present invention, a DVD-Audio playback method includes the steps of reading data stored on a DVD-Audio disk; selecting, from the data which has been read, only audio data or both audio data and video data for output; separating the selected data into audio data and video data if any video data is included in the selected data; outputting the audio data to a speaker; and outputting the video data to a monitor if any video data is included in the selected data.

Preferably, the method further includes the step of detecting the status of the monitor, whereby, based on the status, from the data which has been read, only audio data or both audio data and video data is selected for output.

More preferably, the method detects the connection of the monitor, whether the monitor is powered on, whether the monitor is being used for navigation, and whether the monitor is being used for receiving TV broadcasts when detecting the status of the monitor.

Furthermore, the method preferably allows only audio data or both audio data and video data to be manually selected for output.

According to another aspect of the present invention, a DVD-Audio playback device includes an output data selection unit for selectively outputting data read from a DVD-Audio disk; a data selection setting unit for setting the type of data to be selected in the output data selection unit; a signal separation unit for separating data fed from the output data selection unit into audio data and video data; an audio output unit for processing the separated audio data and outputting the processed audio data to a speaker; a video output unit for processing the separated video data and outputting the processed video data to a monitor.

Preferably, the device further includes a monitor detection unit for detecting the status of the monitor, whereby the data selection setting unit outputs a data selection setting signal in accordance with the output of the monitor detection unit.

More preferably, the monitor detection unit detects the connection of the monitor, whether the monitor is powered on, whether the monitor is being used for navigation, and whether the monitor is being used for receiving TV broadcasts.

Furthermore, the data selection setting preferably allows output of a data selection setting signal in accordance with a manual setting.

The present invention, in another aspect thereof, provides a DVD-Audio playback method for playing back a DVD-Audio disk having a first area where only audio data is stored and a second area where both audio data and video data are stored. The method includes the steps of detecting the status of a monitor; selecting, based on the status, either the first area or the second area; reading data stored on the selected area; separating the data into audio data and video data if the second area is selected; outputting the audio data to a speaker; and outputting the video data to the monitor if the second area is selected. Preferably, the connection of the monitor, whether the monitor is powered on, whether the monitor is being used for navigation, and whether the monitor is being used for receiving TV broadcasts are detected, when detecting the status of the monitor.

The present invention, in another aspect thereof, provides a DVD-Audio playback device for playing back a DVD-Audio disk having a first area where only audio data is stored and a second area where both audio data and video data are stored. The device includes a monitor detection unit for detecting the status of a monitor; a playback control unit for reading either the first area or the second area based on the output of the monitor detection unit; a signal separation unit for separating the data which has been read into audio data and video data; an audio output unit for processing the separated audio data and outputting the processed audio data to a speaker; and a video output unit for processing the separated video data and outputting the processed video data to the monitor. Preferably, the monitor detection unit detects the connection of the monitor, whether the monitor is powered on, whether the monitor is being used for navigation, and whether the monitor is being used for receiving TV broadcasts.

The DVD-Audio playback method and DVD-Audio playback device as described above outputs either audio data only or both audio data and video data as desired by the user. The present invention avoids the problems that the purchase of a new DVD-Audio player with video output capability renders useless a previously purchased DVD-Audio player dedicated for audio, and that DVD-Audio disks of the type which is operated using a menu included in the video data do not allow playback of audio data without a monitor.

DESCRIPTION OF THE PREFERRED EMBODIMENTS

Preferred embodiments of the present invention will now be described with reference to the accompanying drawings.

Figure 1:
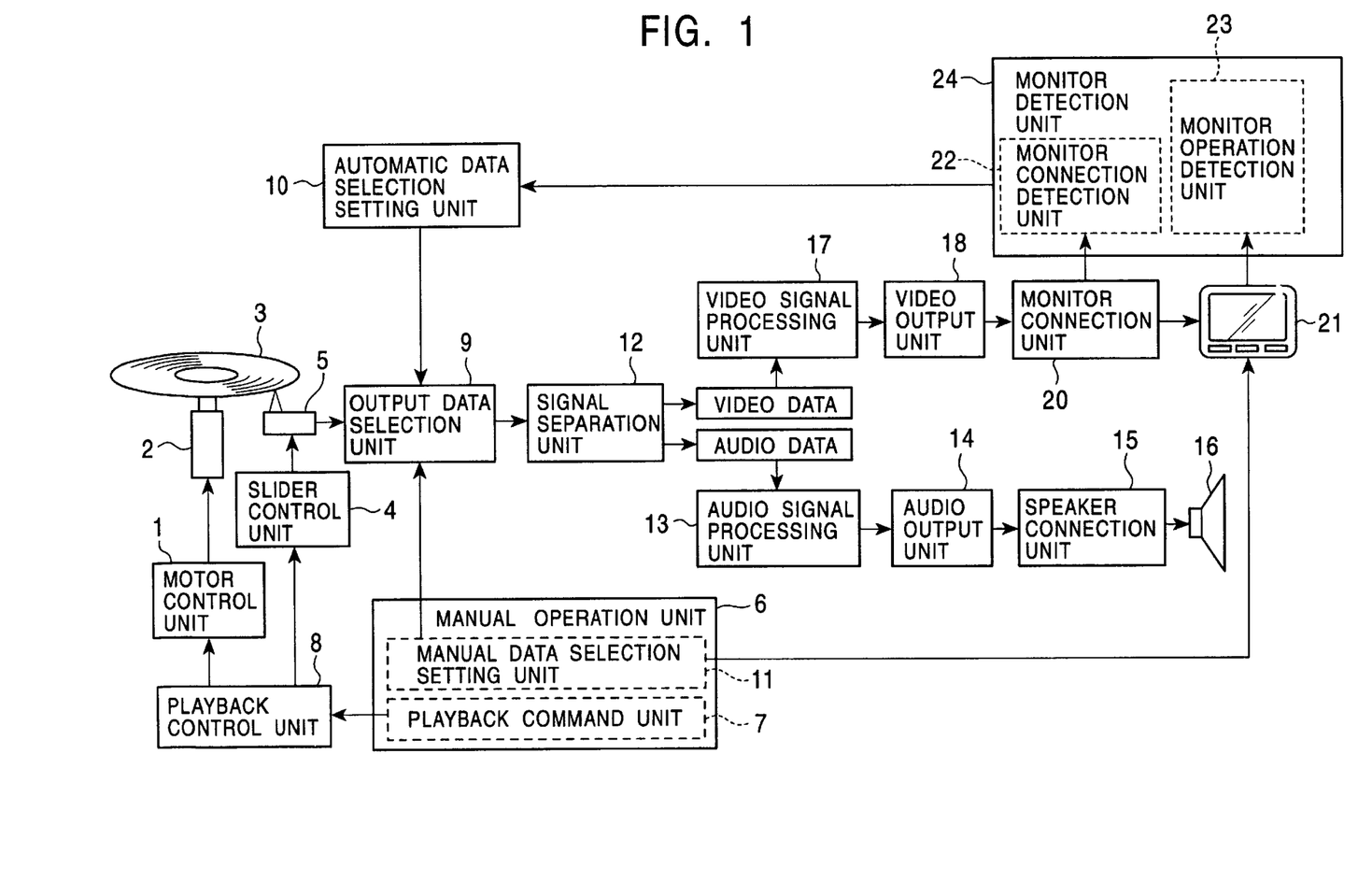
FIG. 1 is a functional block diagram of a DVD-Audio player according to an embodiment of the present invention.

FIG. 1 is a functional block diagram of a DVD-Audio player according to an embodiment of the present invention, which deals with playback of DVD disks employing the audio-video combined recording method shown in FIG. 4A. Referring to FIG. 1, a motor control unit 1 controls a motor 2, and the motor 2 in turn spins a DVD-Audio disk 3. A slider control unit 4 controls the position of an optical pickup 5 in the radial direction of the disk 3, so that the data is read accordingly. In accordance with the output of a playback command unit 7 for select, playback, stop, fast-forward, and other user commands, a playback control unit 8 controls the motor control unit 1 and the slider control unit 4, so that the player operates in accordance with the instructions. It is to be understood that the motor control unit 8 performs a variety of control operations as required, including feedback control of the slider and the pickup based on the data obtained by the pickup.

The data read by the pickup 5 is fed to an output data selection unit 9. The output data selection unit 9 outputs data as specified by an automatic data selection setting unit 10 or by a manual data selection setting unit 11, to be described later. The audio data and the video data are separated in a signal separation unit 12. The audio data separated in the signal separation unit 12 is fed to an audio signal processing unit 13 for audio signal processing, and is then output via an audio output unit 14 and a speaker connection unit 15 to a speaker 16. If video data as well as audio data is selected for output in the output data selection unit 9, the video data separated in the signal separation unit 12 is fed to a video signal processing unit 17 for video signal processing, and then is output via a video output unit 18 and a monitor connection unit 20 to a monitor 21.

Connected to the automatic data selection setting unit 10, there is provided a monitor detection unit 24, including a monitor connection detection unit 22 and a monitor operation detection unit 23. The monitor connection detection unit detects whether a monitor is connected to the DVD-Audio player, and the monitor operation detection unit detects whether the monitor is powered on, and whether the monitor is being used for other purposes such as navigation and reception of TV broadcasts.

The automatic data selection setting unit 10 determines that the independent audio data is to be selected for output by the output data selection unit 9 if any of the following situations is detected by the monitor detection unit 24, more specifically by the monitor connection detection unit 22 or by the monitor operation detection unit 23: the monitor is disconnected from the DVD-Audio player; the monitor is powered off; the monitor is being used for navigation, or the monitor is being used for TV broadcasts. On the other hand, the automatic data selection setting unit 10 determines that the audio data with video data is to be selected for output by the output data selection unit 9 if it is detected that the monitor is connected to the DVD-Audio player, the monitor is powered on, and the monitor is not being used for either navigation or reception of TV broadcasts.

Even when the automatic data selection setting unit 10 specifies that the audio data with video data is to be selected for output, the manual data selection setting unit 11 may be set so that the independent audio data is output if the user desires to temporarily use the DVD-Audio player for audio output only.

Conversely, if the user desires to display video data on the monitor even when the independent audio data is selected for output by the automatic data selection setting unit 10, the manual data selection setting unit 11 may be set so that the video data with audio data is output by the output data selection unit 9. When this setting is made, an input switching signal is output so that the monitor input is switched to the video input of the DVD-Audio player, thereby displaying video images output from the video output unit 18.

The arrangement may be such that the monitor input is not switched for the video output of the DVD-Audio player. Even in that case, the user is allowed to playback only the audio portion of the audio data with video data, if it allows playback without using an operation menu displayed on the monitor, while using the monitor for other purposes such as navigation and reception of TV broadcasts.

Figure 3:
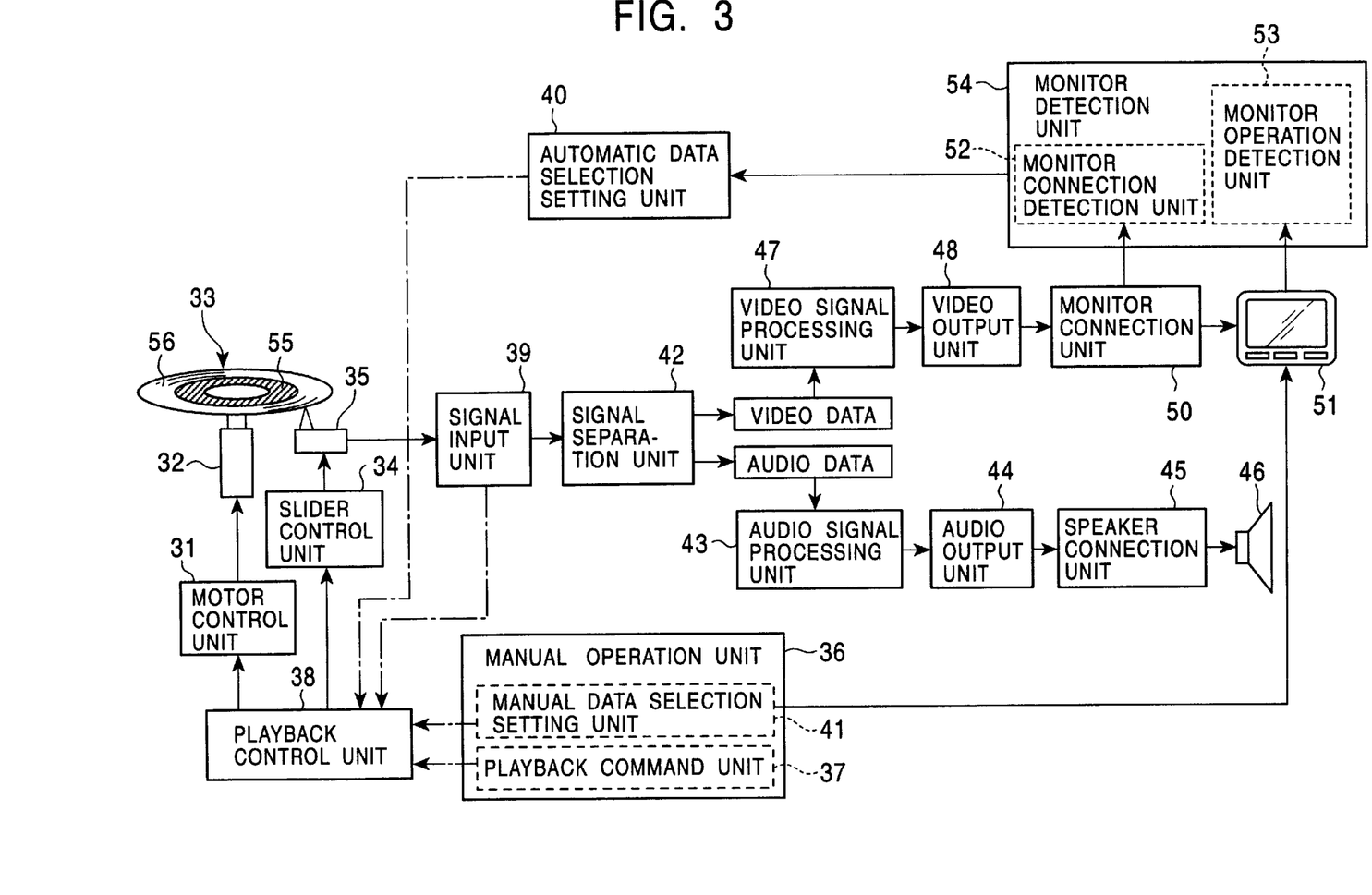
FIG. 3 is a functional block diagram of a DVD-Audio player according to another embodiment of the present invention.

FIG. 3 is a functional block diagram of a DVD-Audio player according to another embodiment of the present invention, which deals with playback of DVD disks employing the audio-video separate recording method shown in FIG. 4B.

The process of signal separation and processes thereafter, together with the corresponding components, are the same as in the DVD-Audio player shown in FIG. 1; thus, a description thereof is omitted hereinbelow.

Referring to FIG. 3, a DVD-Audio disk 33 to be played back by a DVD-Audio player includes an area 55 for storing independent audio data as indicated by hatching, and, surrounding the area 55, an area 56 for storing audio data with video data.

Similarly to the DVD-Audio player in FIG. 1, an automatic data selection setting unit 40 determines that the independent audio data is to be selected for output by a playback control unit 38 if any of the following situations is detected by a monitor detection unit 54, more specifically by a monitor connection detection unit 52 or by a monitor operation detection unit 53: the monitor is disconnected from the DVD-Audio player; the monitor is powered off; the monitor is being used for navigation, the monitor is being used for receiving TV broadcasts. On the other hand, the automatic data selection setting unit 40 determines that the audio data with video data is to be selected for output by the playback control unit 38 if it is detected that the monitor is connected to the DVD-Audio player, the monitor is powered on, and the monitor is not being used for either navigation or reception of TV broadcasts.

Furthermore, similar to the previous embodiment, even when the automatic data selection setting unit 40 specifies that the audio data with video data is to be output, a manual data selection setting unit 41 may be set so that the independent audio data is output if the user desires to temporarily use the DVD-Audio player for audio output only.

The data read by a pickup 35 is fed to a signal input unit 39, and then is output to the playback control unit 38, so that feedback control regarding tracking servo and focus servo of the pickup 35 is performed. The data is also output from the signal input unit 39 to a signal separation unit 42. The subsequent processes are the same as in the previous embodiment.

It is to be appreciated that the above method may be used for DVD-Audio disks employing other recording formats, for example, disks separately storing independent audio data and audio data with video data on each track.

Figure 2:
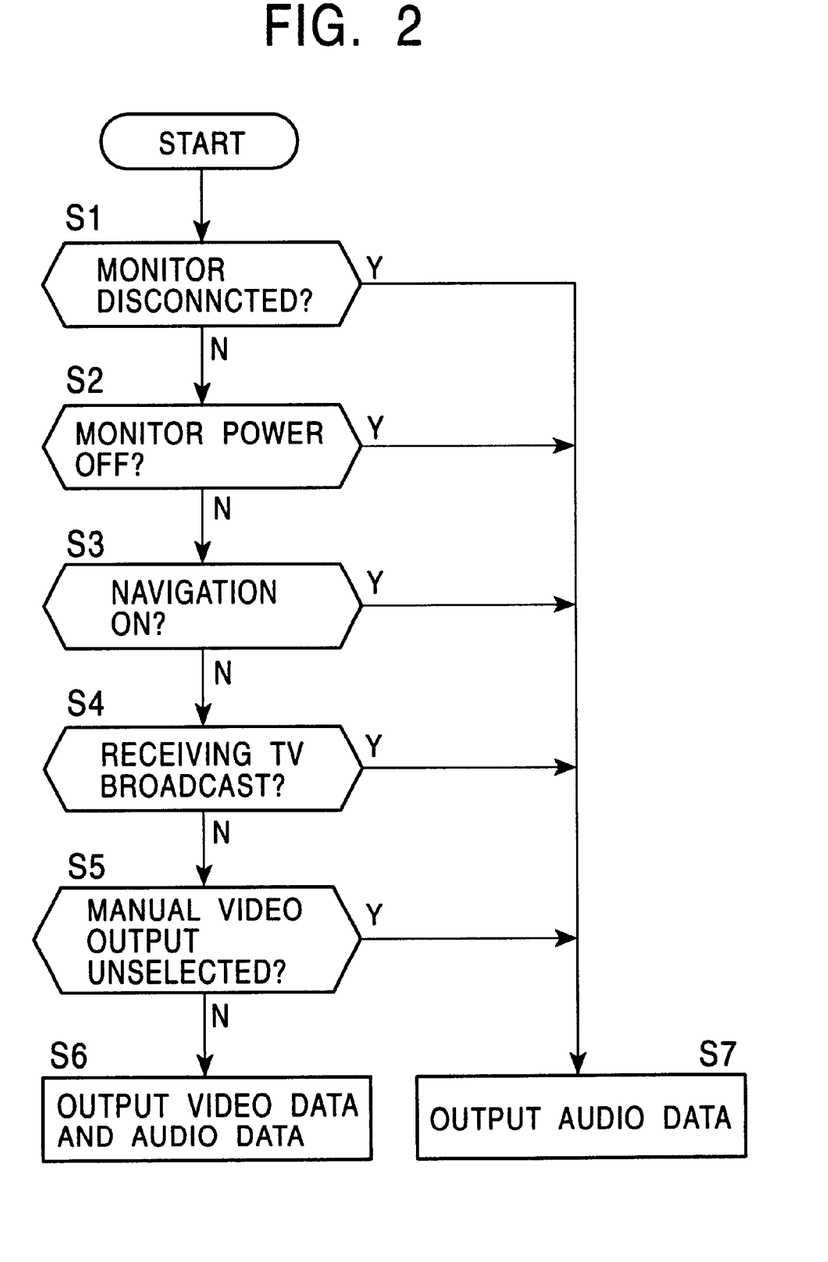
FIG. 2 is a flow chart showing an example of output data selection in the DVD-Audio player according to the present invention.

FIG. 2 is a flow chart showing an example of output data selection in a DVD-Audio player according to the present invention. Although description will be made hereinbelow in the context of the DVD-Audio player shown in FIG. 1, it is to be appreciated that the procedure may also be used in the DVD-Audio player shown in FIG. 3. Referring to FIG. 2, the monitor connection detection unit 22 detects whether a monitor is disconnected from the monitor connection unit 20 of the DVD-Audio player (Step 1). Then, the monitor operation detection unit 23 detects whether the monitor is powered off (Step 2), whether the monitor is being used for navigation (Step 3), whether the monitor is being used for receiving TV broadcasts (Step 4), and whether video output is manually unselected (Step 5). If none of the above status is detected, audio data with video data is selected for output (Step 6). Otherwise, independent audio data is selected for output (Step 7). It is to be appreciated that the procedure may perform the steps in a different order, may skip unnecessary steps, and may detect other monitor status.

What is claimed is:

1. A DVD-Audio playback method comprising:

reading data stored on a DVD-Audio disk;

detecting the status of a monitor and selecting, based on the status, only audio data or both audio data and video data for output from the data that has been read;

separating the selected data into audio data and video data if any video data is included in the selected data;

outputting the audio data to a speaker; and outputting the video data to a monitor if any video data is included in the selected data.

2. A DVD-Audio playback method according to claim 1, wherein the connection of the monitor is detected when detecting the status of the monitor.

3. A DVD-Audio playback method according to claim 1, wherein whether the monitor is powered on is detected when detecting the status of the monitor.

4. A DVD-Audio playback method according to claim 1, wherein whether the monitor is being used for navigation is detected when detecting the status of the monitor.

5. A DVD-Audio playback method according to claim 1, wherein whether the monitor is being used for receiving TV broadcasts is detected when detecting the status of the monitor.

6. A DVD-Audio playback method according to claim 1, wherein only audio data or both audio data and video data are manually selected for output.

7. A DVD-Audio playback device comprising:

output data selection means for selectively outputting data read from a DVD-Audio disk;

data selection setting means for setting the type of data to be selected in said output data selection means;

signal separation means for separating data fed from said output data selection means into audio data and video data;

audio output means for processing the separated audio data and outputting the processed audio data to a speaker;

video output means for processing the separated video data and outputting the processed video data to a monitor; and monitor detection means for detecting the status of the monitor, whereby said data selection setting means outputs a data selection setting signal in accordance with the output of said monitor detection means.

8. A DVD-Audio playback device according to claim 7, wherein said monitor detection means detects the connection of the monitor.

9. A DVD-Audio playback device according to claim 7, wherein said monitor detection means detects whether the monitor is powered on.

10. A DVD-Audio playback device according to claim 7, wherein said monitor detection means detects whether the monitor is being used for navigation.

11. A DVD-Audio playback device according to claim 7, wherein said monitor detection means detects whether the monitor is being used for receiving TV broadcasts.

12. A DVD-Audio playback device according to claim 7, wherein said data selection setting means outputs a data selection setting signal in accordance with a manual setting.

13. A DVD-Audio playback method for playing back a DVD-Audio disk having a first area where only audio data is stored and a second area where both audio data and video data are stored, said method comprising:

detecting the status of a monitor;

selecting, based on the status, either the first area or the second area;

reading data stored on the selected area;

separating the data into audio data and video data if the second area is selected;

outputting the audio data to a speaker; and outputting the video data to the monitor if the second area is selected.

14. A DVD-Audio playback method according to claim 13, wherein the connection of the monitor is detected when detecting the status of the monitor.

15. A DVD-Audio playback method according to claim 13, wherein whether the monitor is powered on, whether the monitor is being used for navigation, and whether the monitor is being used for receiving TV broadcasts are detected, when detecting the status of the monitor.

16. A DVD-Audio playback device for playing back a DVD-Audio disk having a first area where only audio data is stored and a second area where both audio data and video data are stored, said device comprising:

monitor detection means for detecting the status of a monitor;

playback control means for reading either the first area or the second area based on the output of said monitor detection means;

signal separation means for separating the data that has been read into audio data and video data;

audio output means for processing the separated audio data and outputting the processed audio data to a speaker; and video output means for processing the separated video data and outputting the processed video data to the monitor.

17. A DVD-Audio playback device according to claim 16, wherein said monitor detection means detects the connection of the monitor.

18. A DVD-Audio playback device according to claim 16, wherein said monitor detection means detects whether the monitor is powered on, whether the monitor is being used for navigation, and whether the monitor is being used for receiving TV broadcasts.

* * * * *